Sept. 23, 1947. H. OSTERBERG ET AL 2,427,689
MICROSCOPE WITH SPECIAL LIGHT MODIFIERS
Filed Aug. 28, 1942 3 Sheets-Sheet 2
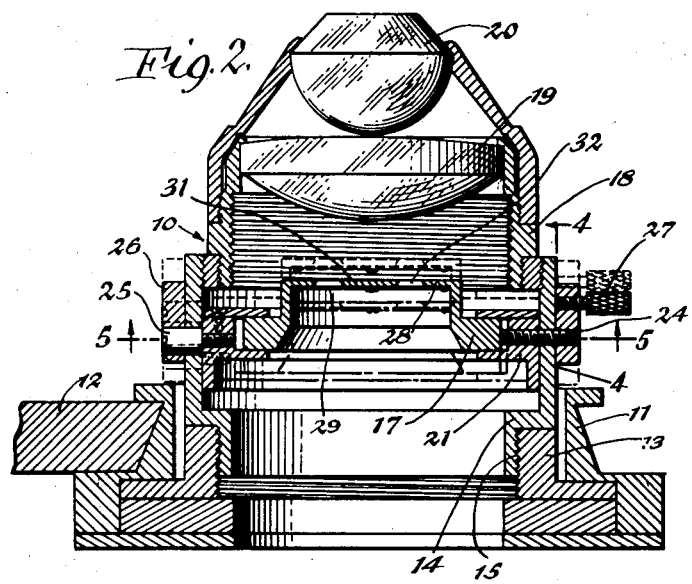
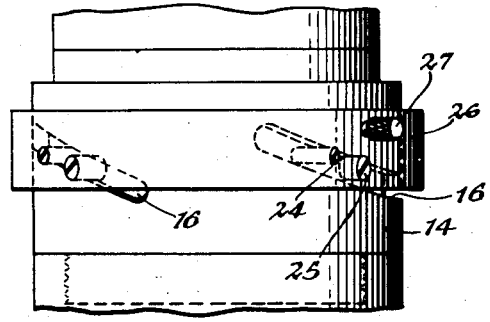
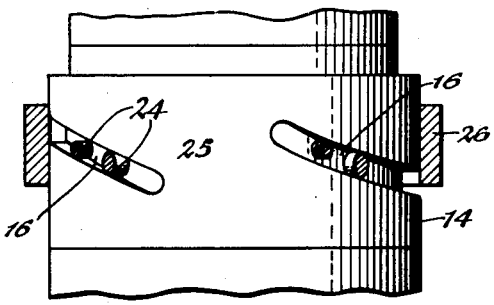
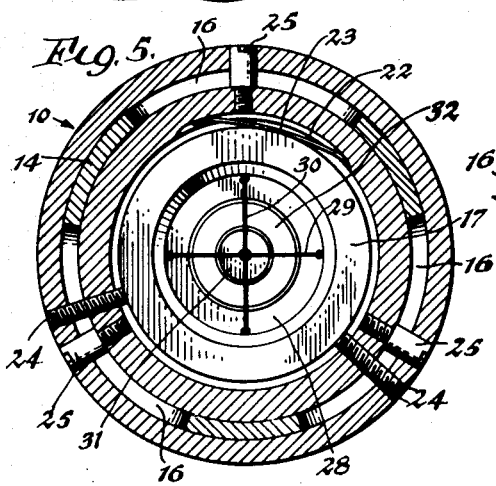
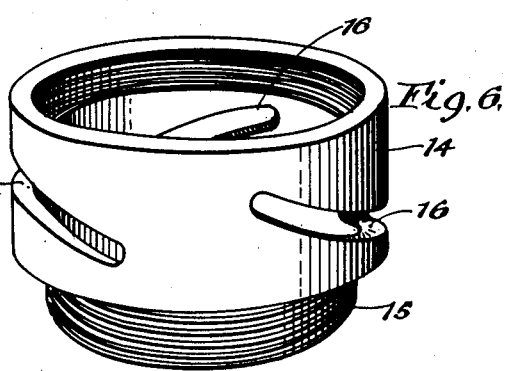
INVENTORS
HAROLD OSTERBERG
HENRY S. SCHRADER
BY Raymond A. Paquin
ATTORNEY

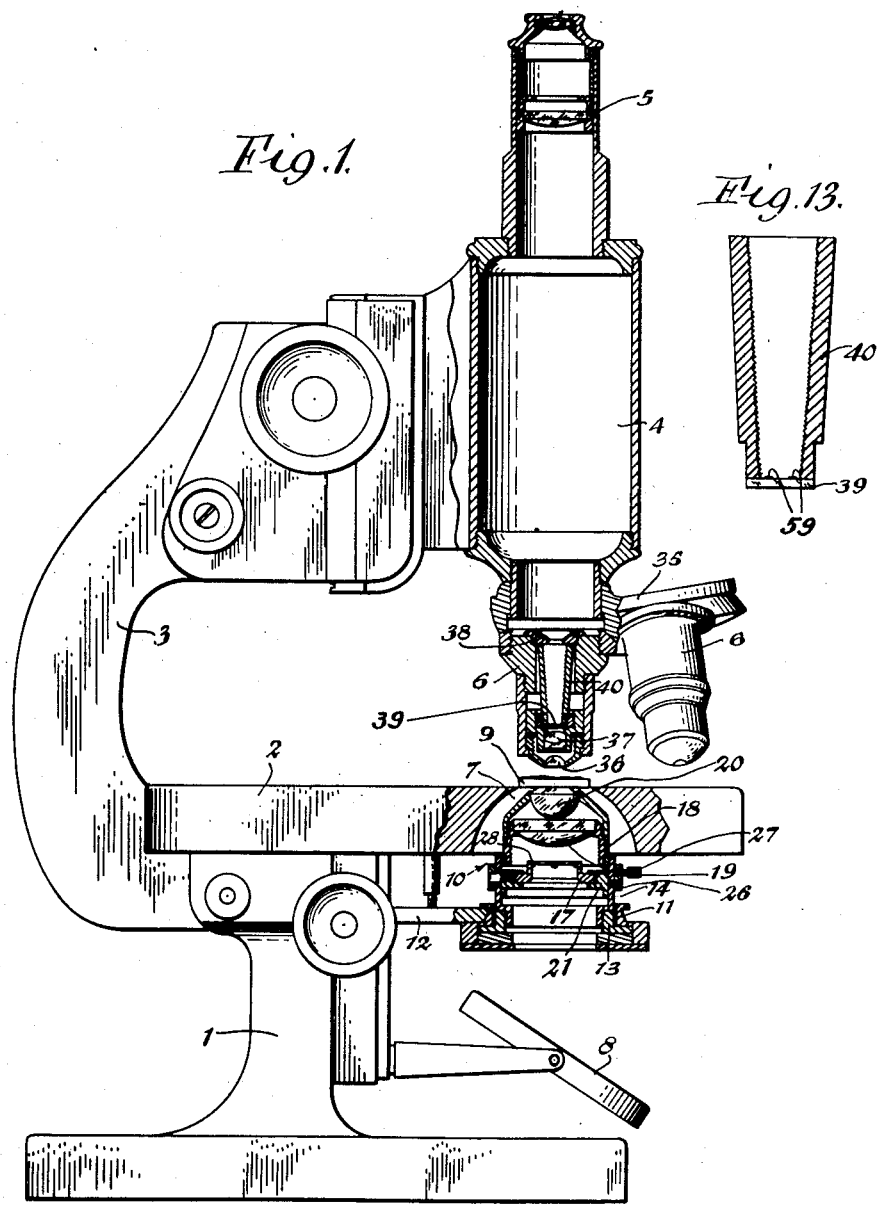

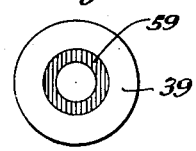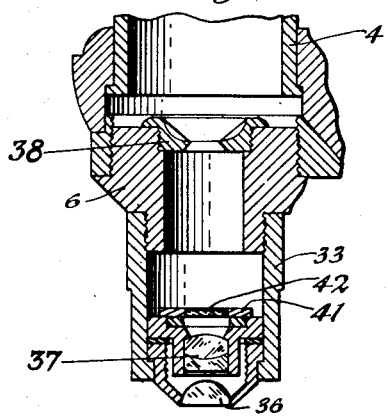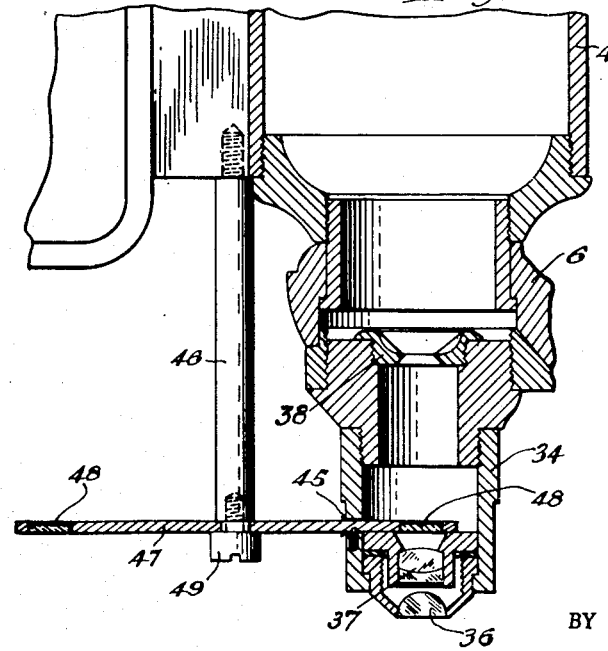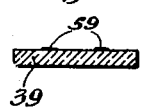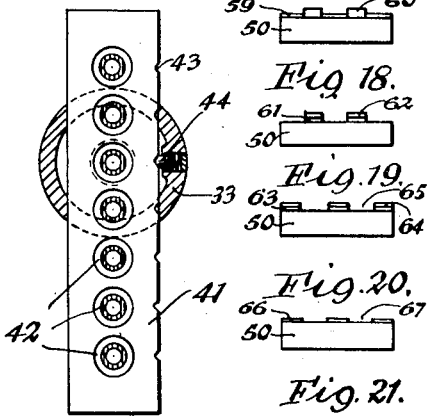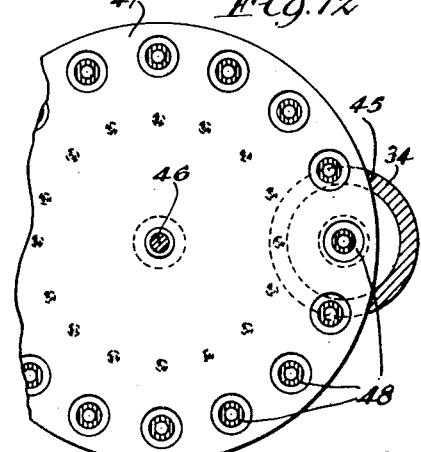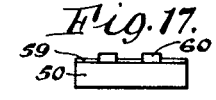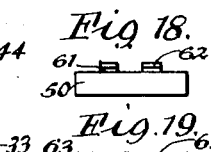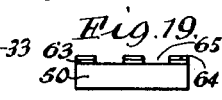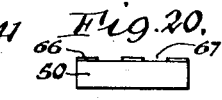

Patented Sept. 23, 1947

2,427,689

UNITED STATES PATENT OFFICE 2,427,689

MICROSCOPE WITH SPECIAL LIGHT MODIFIERS

Harold Osterberg and Henry S. Schrader, Buffalo, N. Y., assignors, by mesne assignments, to American Optical Company, Southbridge, Mass., a voluntary association Application August 28, 1942, Serial No. 456,726

15 Claims. (Cl. 88—39)

This invention relates to optical viewing instruments, for example, microscopes and the like and more particularly to a new and improved means of illuminating and viewing objects.

An object of the invention is to provide a new and improved means for illuminating and viewing objects which will increase the contrast between the various portions of the image of the object.

Another object of the invention is to provide means for obtaining greater differences in contrast between various portions of the image of the object or specimen than has been hitherto possible.

Another object of the invention is to provide means for introducing auxiliary transmission or absorption, in variable amounts, to obtain greater differences in contrast between various portions of the image of a specimen or object.

Another object of the invention is to provide means for introducing auxiliary absorption in combination with phase change, in variable amounts, to obtain greater differences in contrast in the image of the specimen Another object of the invention is to provide means for introducing absorption and/or phase change and which may be rapidly interchangeable to easily and quickly obtain the most desirable differences in contrast between the various portions of the image of the specimen.

Another object of the invention is to provide a series of interchangeable discs or plates each being capable of changing the contrast between various portions of the image of the object to a different degree from the other plates or discs of the series.

Another object of the invention is to provide a means whereby said series of discs or plates may be easily and quickly aligned with the optical system of a microscope whereby the contrast between the various portions of the image of the object may be easily and quickly varied to facilitate the examination or inspection thereof.

Another object of the invention is to provide a series of discs or plates for changing the contrast between various portions of an image of an object viewed through a microscope which discs or plates vary in absorption and/or phase differences.

Another object of the invention is to provide an objective for microscopes which objective is adapted to interchangeably contain discs or plates for changing the contrast between various portions of the image of the object.

Another object of the invention is to provide a new and improved condenser arrangement for microscopes.

Another object of the invention is to provide a new and improved means and method of increasing and intensifying differences in the appearance of objects of different refractive index, that is, increase the contrast between the various portions thereof, without changing substantially the resolving power of microscope.

Other objects and advantages of the invention will be apparent from the following description taken in connection with the accompanying drawings and it will be understood that many changes may be made in the details of construction, arrangement of parts and steps of the process without departing from the spirit of the invention as expressed in the accompanying claims. We therefore do not wish to be limited to the exact details of construction and arrangement of parts and steps of the process as the preferred forms have been shown by way of illustration only.

Referring to the drawings:

Fig. 1 is a side view of a microscope partially in section embodying one form of the invention.

Fig. 2 is a sectional view on an enlarged scale of the condenser arrangement shown in Fig. 1.

Fig. 3 is a fragmentary side view of the condenser arrangement shown in Fig. 2.

Fig. 4 is a view taken on line 4—4 of Fig. 2 looking in the direction of the arrows.

Fig. 5 is a fragmentary view taken on line 5—5 of Fig. 2 looking in the direction of the arrows.

Fig. 6 is a perspective view of the casing for the condenser shown in Fig. 2 and showing the slots for adjustment.

Fig. 7 is a fragmentary view on an enlarged scale showing the phase disc or plate shown in Fig. 1.

Fig. 8 is a central sectional view of the phase disc or plate shown in Fig. 7.

Fig. 9 is a sectional view through an objective generally similar to the objective included in Fig. 1 and showing a slide arrangement of the phase discs or plates.

Fig. 10 is a horizontal sectional view illustrating in detail the slide arrangement of phase discs or plates shown in Fig. 9.

Fig. 11 is a vertical sectional view on an enlarged scale of another arrangement of the phase discs or plates.

Fig. 12 is a fragmentary top view of the phase disc arrangement shown in Fig. 11; and Fig. 13 is an enlarged view of the form of disc or plate shown in Fig. 1.

Figs. 14 to 21 inclusive are sectional views generally similar to Fig. 8 but showing other forms of discs or plates.

In the past where the usual microscopes have been employed, there has been considerable difficulty in distinguishing between portions of a specimen where said portions differ very slightly in refractive index. This was particularly true in the case of living cells where the refractive index of the cells was but slightly different from the refractive index of the fluid in which they were located.

With the usual type microscope the only way that it was possible to distinguish such small differences in refractive index was to stop down the condenser diaphragm. This reduced the numerical aperture and therefore reduced the resolving power. This method permitted a very restricted degree of contrast at the expense of diminished resolving power. It will be seen, therefore, that to increase the visibility and distinguish between such small differences in refractive index that this could only be done to a very limited extent and only by reducing the numerical aperture which accordingly reduces the resolving power.

In recent years attempts have been made to increase and intensify such differences in contrast in objects having regions or areas with small differences in refractive index. Such attempts have involved the use of a phase contrast method which involved the placing of a ring aperture in the focal plane of the condenser and then placing a ring of a dielectric material upon the objective to form a phase plate on said objective. This arrangement did provide a notable increase in contrast between the above mentioned regions having small differences in refractive index but provided neither the greatest nor the most desirable contrast in most cases and as there was provided only a single phase plate with each objective the contrast obtained was merely such as could be obtained with the particular phase plate provided.

It therefore is an object of this invention to provide plates or discs capable of giving different absorption and means for allowing the same to be placed in the optical path of the instrument.

It is another object of this invention to provide a series of plates or discs each being capable of giving different phase, that is, a series of discs or plates of variable phase and means for allowing said discs or plates to be interchanged as desired in the optical path of the instrument.

It is another object of this invention to provide a series of plates or discs each being capable of giving different absorption and/or means for easily and quickly interchanging said plates as desired in the optical path of the instrument.

It is another object of the present invention to provide a condenser arrangement for use with such absorption and/or phase plates which condenser contains a ring stop which is centerable and which may be easily and quickly adjusted vertically in order that the image of the stop can be focused sharply and made to coincide with the phase plate in the optical path, or in other words so that the phase plate will be in the focal plane of the combined optical system (made up of the condenser combined with the objective) conjugate to the stop.

It is a further object of this invention to provide discs which differ in phase and/or absorption and preferably with means for easily and quickly inter-changing a series of such discs as desired in the optical path.

By a phase plate or disc is meant a disc or plate which presents zones or areas of different optical path to the traversing light beam. Any particular optical path may be expressed in the usual manner or the product $nt$ where $n$ is the index of refraction and $t$ is the distance traversed. Thus if a thickness $t$ of dielectric material of index $n$ is deposited upon glass to form a zone, the optical path difference between this zone and the adjacent area is $nt$ (optical path through deposited dielectric) $-t$ (optical path through equal thickness of air) $=t$ $(n-1)$ By an absorption or transmission plate or disc is meant a plate or disc which presents zones or areas of different light transmission to the traversing light beam where light transmission is the ratio of the intensity of the emergent light to the incident light.

By an optical member having a portion thereof specially modified in its effect on the wave characteristics of light rays transmitted thereby is meant an optical member such as a plate or disc which has a zone or area which present different light transmission alone or different optical path alone or both combined.

Referring more particularly to the drawings wherein similar reference characters designate corresponding parts throughout the several views, the microscope shown embodying the invention comprises, a base 1, stage 2, and upright support 3 supporting the body tube having the eyepiece 5 and objective 6.

The stage 2 has an opening 7 therethrough to allow light to be reflected by the reflector 8 beneath the stage 2, through transparent objects such as the object shown at 9 to allow said object to be viewed through the microscope.

Also beneath the stage 2 and in aligned relation with the reflector 8, opening 7, and the objective 6 which is aligned with the body tube 4 and eyepiece 5 is the condenser arrangement 10. This condenser arrangement 10 comprises a member 11 adapted to engage the support 12, to retain the said condenser arrangement 10 in desired alignment and said support 12 is vertically adjustable to allow adjustment of said condenser arrangement.

Within the member 11 is the annular member 13 to which is threadedly secured the cylindrical member 14 having the threaded portion 15 adjacent its lower end adapted to engage the threaded portion on the annular member 13 to retain the parts in assembled aligned relation.

In the walls of said cylindrical member 14 are provided the bayonet slots 16, of which three are shown, but which may be of any desired number. These slots are provided to allow the accurate vertical adjustment of the ring aperture member 17, as hereinafter described.

Adjacent the upper end of the cylindrical member 14 is secured the lens ring or barrel 18 containing the usual condenser lenses 19 and 20. Within the cylindrical member 14 is secured the centering ring 21 adapted to receive the peripheral portions of the ring aperture member 17 to support the same. In the centering ring 21 is provided the slot 22 adapted to contain the blade spring member 23 which engages a portion of the periphery of said ring aperture member 17 and which spring member 23 in conjunction with the centering screws 24 and 25 allows the desired adjustment or centering of said ring aperture member 17.

Secured to the centering ring member 21 are the screws 25, one of which is provided for each of said bayonet slots 16 in the cylindrical member 14 and said screws 25 each has a portion extending into its respective slot 16 which acts as a guideway for said screws 25 and provides for the adjustment of the ring aperture member 17. The screws 25 have their outer extremities in the annular ring 26 which encircles the slotted portion and adjacent area of the cylindrical member 14 whereby rotation of said annular ring 26 will cause rotation of said centering ring member 26 and said ring aperture member 17 to vertically adjust said ring aperture member 17 to desired position. Said ring member 26 may also be provided with the set screw 27 which serves both as an actuating member for the ring member 26 and a locking screw to lock the ring members in desired adjustment.

The ring aperture member 17 has the lip portion 28 to which are secured the ends of the cross wires 29 and 30 or the like by solder or the like, and which cross wires are secured adjacent their center, by solder or the like, to a circular member 31 to support the same and provide a ring shaped light aperture 32 through which light is reflected by the reflector 8.

It is pointed out that instead of the circular member 31 and cross wires 29 and 30 that the ring aperture could be formed by forming a piece of glass to be supported by said member 17 and then depositing by evaporation or other method, a coating of desired metal, such as silver or the like, to form the ring light aperture.

In order to obtain the desired contrast it is necessary that in addition to providing the ring aperture in the condenser as outlined above, that the objective contain the proper disc or plate as hereinafter described.

These discs or plates are preferably formed of discs of glass on each of which is deposited an annular ring of desired material or materials as described hereinafter.

We have found that by providing discs or plates having zones having different transmission or absorption that the observing of various parts of objects of the type described above may be facilitated. Discs or plates which are capable of providing different light transmission through different portions or zones thereof may be formed by depositing on glass a ring of a metal such as gold, copper, silver, etc., that is, a metal having absorbing power. By providing a series of such absorption plates or discs of varying absorbing power, that is, with each plate or disc of such series having a different absorption or transmission, that because of the difference in the composition and hence refractive index of various objects a particular absorption plate or disc of the series will give better contrast than any other plate or disc of the series for the particular object.

Also, because of the difference in refractive index between parts of objects as stated above, by forming a series of discs or plates of different absorption or phase change or phase change combined with different absorption that a particular disc or plate having a particular absorption or phase change combined with a particular absorption will give better contrast between parts of the image of the specimen than any other plate or disc of the various absorptions and/or phases for observing a particular object. Such a series should be formed so as to allow amounts of absorption from zero to one hundred per cent either continuously or in discrete steps. An example of a series in steps would be to have one disc 5 percent, the next 25 percent, the next 50 percent, the next 75 percent and the next 100 percent.

In forming each of the series of discs or plates of various phase changes a ring of a dielectric such as magnesium fluoride, cryolite, quartz or other similar material is deposited on a disc of glass and each disc or plate of the series is provided with a ring of a dielectric as described above of different thickness or different material or both. Such series should be so formed as to allow changes in phase from zero wavelength to one wavelength phase either continuously or in discrete steps.

An example of a series in steps would be to have one disc of zero phase, i. e., absorption alone, another of one eighth wavelength phase, the next one quarter, the next three eighths, the next one half, the next five eighths, the next three quarters and the next seven eighths. Or, if desired, the series could be in quarter wavelength steps, or other desired steps.

To form the discs or plates having rings or zones of both differences in light transmission and phase change the ring of the metal having absorption power is first formed on the piece of glass as described above and over the surface of the metallic ring is deposited a ring of a dielectric, as also described above to give the phase change. These can be deposited in either order as desired, and as many layers as may prove to be advantageous. We have found that by depositing on a disc of glass a ring of copper of a thickness to give about 40 per cent transmission and depositing over the copper ring a ring of magnesium fluoride of about one quarter wavelength in thickness that a very satisfactory disc having both phase and absorption can be obtained. Such a series could be so formed as to allow changes in phase from zero wavelength to one wavelength combined with changes in absorption from zero to one hundred per cent.

Also, if desired, a ring of a metal such as aluminium, which introduces both absorption power and a phase change of its own may be used, which will in some cases eliminate the necessity of the dielectric coating over the metallic coating.

It is pointed out that the absorption afforded by a given thickness of the deposited metal is not independent of the thickness of the dielectric layer deposited upon it and that the phase of the composite layer is not necessarily the sum of the phases through each layer alone. Thus to obtain a plate or disc of specified phase and absorption with a bilayer of metal and dielectric a predetermined thickness of each will be required. It may be possible to find metals having suitable indices of refraction and transmissivities so that a superimposed layer of dielectric may be avoided in order to obtain a specified absorption and phase.

Also, by selecting an absorbing dielectric or a semi-conductor it will in some cases be possible to secure the specified absorption and phase by depositing of said materials alone.

Also, it is pointed out that instead of the absorbing layer, a light scattering layer might be employed, for example, an acid etched surface or a slightly ground surface, or a deposited layer. Such a layer would undoubtedly deteriorate the image and resolving power but they might be satisfactory in certain cases.

Also, it is possible to chemically combine the dielectric material and the material for the absorption layer and thus requiring only the forming of a single layer of the combined material by a chemical process. An example of this would be a silicate solution containing very fine metallic particles in collodial suspension.

In forming the series as outlined above, a series may be formed comprising only discs or plates capable of giving various absorption powers and another series formed capable of giving various phase changes and another series formed capable of giving both various phase changes and various absorption powers, as each such series might have particular advantages for use in observing particular types of objects. Also a series could be formed containing discs or plates from each of the above series in any desired sequence. This would give a much wider choice or range in a single series and would be the most practical for general use.

It is also desirable that means be provided to allow easily and quickly interchanging said discs or plates as desired in the optical path to allow the use of the particular plate or disc which gives best contrast for the particular object. It is also preferable that means be provided whereby the various series are easily and quickly interchangeable to allow the use of the different series with the same object and/or the easy and rapid adaptation of the microscope for viewing different objects.

In the drawings we have shown several forms in which the phase and/or absorption discs may be incorporated into a microscope. While the arrangement has been shown applied to a microscope it will be understood that such arrangement may be used with other devices where there are differences in refractive indices in the optical path such as strain analyzers.

In the forms of the invention shown the objectives, 6 in Fig. 1, 33 in Fig. 9, and 34 in Fig. 11 are secured to the lower portion of the body tube 4 and said objectives may either be of the rotary interchangeable type shown in Fig. 1 where a plurality of objectives are positioned on a nosepiece 35 which is rotatable to align either of the objectives with the body tube 4 or of the type shown in Figs. 9 and 11 wherein each objective is directly secured to the lower end of the body tube 4.

The objectives 6, 33 and 34 each contain the usual objective lenses 36 and 37 and the diaphragm 38.

In the form of the invention shown in Fig. 1 the phase and/or absorption disc or plate 39 is secured adjacent the lower end of the tubular member 40, which is shown enlarged and in detail in Fig. 13.

The said tubular member 40 fits into the hollow bore of the objective 6 and is retained therein by the diaphragm member 38 which is threaded into the upper end of the objective 6. Thus, to insert or remove the disc or plate 39 and its support 40 it is necessary to unscrew the objective from the nosepiece or body tube and then unscrew the diaphragm 38 from the upper end of the objective 6 after which the member 40 may be inserted or removed. This allows interchangeability of said discs 39 as desired.

In Figs. 9 and 11 we have shown forms of the invention which allow much more rapid and easy interchange of the discs or plates in the optical path and also easy and rapid interchange of the particular series of discs or plates 39 as desired.

In the form shown in Fig. 9, the objective which is generally similar to that shown in Fig. 1, is provided with diametrically opposed slots in the walls thereof through which slide the slide member 41 containing the series of discs or plates 42. The edge of the slide 41 is provided with a series of indentations 43 adapted to receive the index member 44 on the wall of the objective 33 to retain the desired disc or plate 42 in alignment with the optical path of the instrument.

It will be seen that this construction allows the rapid and easy interchange of discs in the optical path of the instrument and also allows the rapid and easy interchange of the series of discs in use by replacement of the slide 41 by other similar slides containing discs having different phase and/or absorption properties.

In the form of the invention shown in Fig. 11, the objective is generally similar to that shown in Figs. 1 and 9 above but instead of the opposed slots as shown in the form of the invention shown in Figs. 9 and 10, the objective is provided with the slot 45 on the side thereof toward the support 46 which is secured at one end to the body tube of the microscope or support therefor and which rotatably supports the rotatable disc 47 containing the series of discs or plates 48.

The rotatable disc 47 is preferably secured to the support 46 by an easily and quickly interchangeable connection such as the set screw 49 or a spring member may be provided which extends through the opening in the center of the disc 47 to allow the said disc 47 to be easily and quickly interchanged with other similar discs containing other series of phase and/or absorption discs 48.

In Figs. 8 and 14 to 21 inclusive are shown a number of forms in which the plates or discs 39 may be formed, and the series of such discs or plates may be composed of a number of series each of one of the particular forms shown or each separate series might contain plates or discs of different types depending upon the use for which the series is intended. It is also pointed out that such series of discs or plates may be particularly formed for use with a particular objective and different series formed for each objective.

In the form shown in Figs. 7 and 8 the disc comprises a glass base 39 having an annular ring 59 deposited thereon by any suitable means such as being deposited thereon by evaporation in a vacuum and said annular ring may be formed of a metal as stated above where change in absorption and/or phase is desired. If only a phase change is desired, then said annular ring 59 may be formed of a dielectric such as magnesium fluoride, crylolite, etc., as stated above.

In the form shown in Fig. 14, a coating 51 of either a metal or a dielectric is first deposited over the surface of a glass disc 50, and then a coating 52 of either metal or dielectric deposited over the coating 51, that is, if the coating 51 is a metal, then the coating 52 would be of a dielectric and vice versa. In forming the coating 52, the annular opening 53 through the coating 52 is left uncoated to give the desired result.

In the form shown in Fig. 15 a coating 54 is deposited on the surface of the glass disc 50 and then a coating 55 of the other material is deposited over the surface of the coating 54 and then an annular ring 56 of material similar to the coating 54 is deposited on the surface of the coating 55.

In the form shown in Fig. 16 a coating 57 of either metal or dielectric is formed on the surface of the glass disc 50 and then the annular ring 58 of the opposite material formed on the surface of the coating 57.

In the form shown in Fig. 17 a coating 59 of either metal or dielectric is formed on the surface of the glass disc 50 but leaving uncoated an annular ring and then an annular ring 60 is formed in said uncoated portion, said annular ring is formed of the opposite material to the coating 59, that is, if the coating 59 is of a dielectric material then the annular ring 60 would be formed of a metal and vice versa.

In the form shown in Fig. 18 an annular ring 61 of a metal or a dielectric is first deposited upon the surface of the glass disc 50 and then another coating 62 of the opposite material deposited over the surface of said annular ring 61 to form a composite annular ring.

The form shown in Fig. 19 comprises a coating 63 of a dielectric or a metal over the surface of the glass disc 50, leaving uncoated the annular ring 65 and then a coating 64 of the opposite material over the coating 63 to form a composite coating with an uncoated annular ring 65.

In Fig. 20 is shown another form which comprises placing a coating 66 of a metal or a dielectric over the surface of the glass disc 50 and leaving the uncoated annular ring 67.

While Figs. 8 and 14 to 21 inclusive show numerous forms in which the plates or discs may be made it is conceivable that many other variations may be made in the form of said plates or discs without departing from the scope of this invention.

The form shown in Fig. 21 comprises a coating varying in thickness from the center to the edge and this coating 68 may be of metal or dielectric or be composed of a layer of each depending upon the results as described above. Also, instead of being of a continuous tapering thickness this coating could be formed of a plurality of abutting annular zones of variable absorption or phase or both.

In using the series of absorption and/or phase plates or discs, the said discs are interchangeably positioned in the optical path of the viewing instrument and interchanged until the desired or best contrast is obtained. Also the series may be changed and the discs of the new series aligned with the optical path until the desired or best contrast is obtained.

From the foregoing it will be seen that we have provided simple, efficient and economical means for obtaining all of the objects and advantages of the invention.

Having described our invention, we claim:

1. In a microscope, a light modifying member for cooperating with an objective arranged to focus upon an object through which light is passed from a condenser having a modified aperture, the modified aperture of the condenser and said light modifying member cooperating to increase contrast in the image produced thereby, said light modifying member comprising a transparent base carrying a metallic coating over a portion thereof and a coating of a di-electric material over another portion thereof, the contours of both of said coatings substantially conforming to the contour of said aperture.

2. In a microscope for obtaining by diffraction an increase in contrast in the image which is produced by the microscope, the combination with a condenser, an objective and an eyepiece, of an adjustable aperture for the condenser, said aperture having a predetermined contour, and a light modifying member arranged between the objective and the eyepiece, said light modifying member comprising a transparent base having a coating over one portion thereof for modifying the amplitude of the light transmitted thereby, and a coating over another portion thereof for modifying the phase of the light transmitted thereby, said aperture being adjustable longitudinally of the optical axis of the microscope to focus the image of said aperture upon said light modifying member.

3. In a microscope for obtaining by diffraction an increase in contrast in the image which is produced, the combination with an eyepiece, an objective, a light modifying member between the objective and the eyepiece and a condenser, of an adjustable aperture for said condenser, said aperture being adjustable axially of the condenser to focus the image of said aperture upon said light modifying member for improving the contrast in the image produced by the microscope.

4. In a microscope, the combination with a condenser having an aperture of predetermined contour, an objective and an eyepiece, of light modifying means in the focal plane of said condenser combined with said objective conjugate to said aperture, said light modifying means cooperating with the aperture of the condenser for obtaining by diffraction an increase in contrasts in the image which is produced by the microscope, said light modifying means comprising a carrier supporting a plurality of light modifying optical elements each having a portion thereof coated for changing the phase or the amplitude of the image forming light rays transmitted by the objective to the eyepiece of said microscope, or both, and means for varying the position of said carrier relative to the optical axis of the microscope to selectively position a given light modifying element in accurately corresponding position to the aperture of the condenser to thereby modify the contrast obtained in the image produced by the microscope.

5. In a microscope having an eyepiece, an objective and a condenser with a ring aperture, a light modifying member between the objective and the eyepiece cooperating with the ring aperture of the condenser to modify the contrast obtained in the image produced by the microscope, said light modifying member being provided with concentric annuli, one being adapted to modify the amplitude of the light transmitted thereby relative to the remainder of said member and another being adapted to modify the phase of said light by a fraction of a wavelength.

6. An optical element for use in a microscope for modifying the light producing the image which is observed through the eyepiece of the microscope, said element being of transparent material and carrying on one of its surfaces a ring-shaped coating of metal, the remainder of said surface being coated with a dielectric material for altering the phase of light passing therethrough a predetermined fraction of a wavelength, said element being adapted to be inserted in the optical path of the microscope for cooperation with a substage condenser having an aperture of contour corresponding to said annular ring.

7. An optical element for mounting in the optical system of a microscope, said element being adapted to modify the image producing light rays transmitted from the object being observed to the eyepiece of the microscope, the body portion of said element being transparent and having on a ring-shaped portion of one of its surfaces a plurality of coatings, one of said coatings being metallic for diminishing the amplitude of the light rays passing therethrough and another of said coatings being of a dielectric material for altering the phase of said light rays a predetermined fraction of a wavelength, said element being insertable in the optical path of the microscope for cooperation with a substage condenser having an aperture of contour corresponding to said annular ring.

8. In a microscope, in combination with a microscope objective having a tubular support slotted in a plane normal to the axis of the objective, a carrier slidable within said slot and having mounted thereon a series of transparent optical elements coated to modify the image producing light rays transmitted from the object being observed to the eyepiece of the microscope, the coating on each element including a ring-shaped portion, certain of said ring-shaped coating portions being metallic for diminishing the amplitude of the light rays passing therethrough and certain of said ring-shaped coating portions being of a dielectric material for altering the phase of said light rays a predetermined fraction of a wave length, and a spring-pressed detent cooperating with stops on said carrier for positioning a selected one of said coated optical elements in the optical path of said image producing light rays.

9. In a microscope for obtaining by diffraction an increase in contrast in the image which is produced, the combination with an eye piece, an objective, a light modifying member disposed in the optical path of said objective, and a condenser, said member being in the conjugate focal plane of the combined lens system comprising said condenser and said objective, of an adjustable aperture for said condenser and means for vertically adjusting said aperture, said adjusting means comprising slotted portions in the wall of said condenser and guide elements on said aperture extending into said slots whereby a movement of said elements in said slots will raise or lower said aperture to focus the image of said aperture upon said light modifying member for improving the contrast in the image produced by the microscope.

10. In a microscope for obtaining by diffraction an increase in contrast in the image which is produced, the combination according to claim 9 having means for locking said aperture in adjusted position.

11. In a microscope for obtaining by diffraction an increase in contrast in the image which is produced, the combination according to claim 9 having means for centering said aperture.

12. In a microscope for obtaining by diffraction an increase in contrast in the image which is produced, the combination with an eye piece, an objective, a light modifying member disposed in the optical path of said objective, and a condenser, said member being in the conjugate focal plane of the combined lens system comprising said condenser and said objective of an adjustable aperture for said condenser and means for vertically adjusting said aperture to focus the image of said aperture upon said light modifying member for improving the contrast in the image produced by the microscope, said adjusting means comprising slotted portions in the wall of said condenser, guide elements on said aperture extending into said slots and an annular ring surrounding a portion of said condenser wall and connected with said guide elements whereby the movement of said ring will cause movement of said guide elements in said slots to raise or lower said aperture.

13. In a microscope for obtaining by diffraction an increase in contrast in the image which is produced, the combination with an eye piece, an objective, a light modifying member disposed in the optical path of said objective, and a condenser, of an adjustable aperture for said condenser, said aperture being adjustable axially of the condenser to focus the image of said aperture upon said light modifying member for improving the contrast in the image produced by the microscope and comprising a stop member and supporting wires for positioning said stop member in an opening in said condenser.

14. In a microscope, the combination with a microscope objective in a tubular support, an eye piece optically aligned therewith and a condenser having an aperture of predetermined contour, said tubular support being slotted in the plane in which said condenser combined with said objective focuses said aperture, of a plurality of different specially modified optical members, each of said optical members having one portion which modifies the wave characteristics of the image forming light rays transmitted by the objective to the eye piece of said microscope relative to the wave characteristics of the image forming light rays passing through other portions of the respective member, and a mount carrying said optical members and rotatable on a pivot in fixed relation to said tubular support to move said optical members along an orbit extending within said slot and into aligned position with the optical axis of the objective for the accurate focusing thereon of said aperture, each of said optical members when in said position cooperating with the aperture of the condenser for obtaining by diffraction an increase in contrast in the image which is produced by the microscope.

15. In a microscope, the combination with a microscope objective in an objective support, an eye piece pivotally aligned therewith and a condenser having an aperture of predetermined contour, said support being slotted in the plane in which said condenser combined with said objective focuses said aperture, of a slide movable in said slot and a plurality of different specially modified optical members in said slide, each of said optical members having one portion which modifies the wave characteristics of the image forming light rays transmitted by the objective to the eye piece of said microscope relative to the wave characteristics of the image forming light rays passing through other portions of the respective member, said slide being provided with positioning means for accurately aligning any selected optical member with the optical axis of the objective for the accurate focusing of said aperture on said member, each of said optical members when so positioned cooperating with the aperture of the condenser for obtaining by diffraction an increase in contrast in the image which is produced by the microscope.

HAROLD OSTERBERG.
HENRY S. SCHRADER.

REFERENCES CITED

The following references are of record in the file of this patent:

UNITED STATES PATENTS

| Number | Name | Date |
|---|---|---|
| 2,237,943 | Lichotzky | Apr. 8, 1941 |
| 905,633 | Bausch | Dec. 1, 1908 |
| 1,860,430 | Poser | May 31, 1932 |
| 2,264,835 | Flint | Dec. 2, 1941 |
| Re. 22,076 | Cartwright | Apr. 21, 1942 |
| 513,912 | Gardam | Jan. 30, 1894 |
| 2,265,182 | Mestre | Dec. 9, 1941 |
| 1,724,425 | Spierer | Aug. 13, 1929 |
| 1,784,425 | George | Dec. 9, 1930 |
| 2,079,621 | Land | May 11, 1937 |
| 561,132 | Roche | June 2, 1896 |
| 2,205,179 | Schultz | June 18, 1940 |

FOREIGN PATENTS

| Number | Country | Date |
|---|---|---|
| 98,827 | Switzerland | Apr. 16, 1923 |
| 100,631 | Switzerland | Aug. 1, 1923 |
| 12,512 | Great Britain | May 30, 1907 |
| 636,168 | Germany | Oct. 7, 1936 |